(12) United States Patent
Doppling et al.

(10) Patent No.: US 7,600,614 B2
(45) Date of Patent: Oct. 13, 2009

(54) ASSEMBLY COMPRISED OF A BRAKE DISK WITH A HUB

(75) Inventors: Horst Doppling, Herzogenaurach (DE); Jochen Burgdorf, Offenbach (DE); Peter Niebling, Bad Kissingen (DE); Heinrich Hofmann, Schweinfurt (DE)

(73) Assignee: FAG Kugelfischer AG (DE)

( * ) Notice: Subject to any disclaimer, the term of this patent is extended or adjusted under 35 U.S.C. 154(b) by 0 days.

(21) Appl. No.: 10/983,274

(22) Filed: Nov. 5, 2004

(65) Prior Publication Data

US 2005/0126870 A1 Jun. 16, 2005

(30) Foreign Application Priority Data

Nov. 6, 2003 (DE) ................. 103 52 327

(51) Int. Cl.
*F16D 65/12* (2006.01)

(52) U.S. Cl. ................. 188/218 XL; 188/26

(58) Field of Classification Search ......... 188/218 XL, 188/26
See application file for complete search history.

(56) References Cited

U.S. PATENT DOCUMENTS

| | | | | | |
|---|---|---|---|---|---|
| 2,243,334 | A | * | 5/1941 | Eksergian ............. | 188/218 XL |
| 2,375,566 | A | * | 5/1945 | Lipps ................... | 188/218 XL |
| 2,775,105 | A | * | 12/1956 | Banker ................. | 464/101 |
| 4,043,437 | A | * | 8/1977 | Taylor .................. | 192/13 R |
| 4,625,947 | A | * | 12/1986 | Denman et al. ....... | 254/323 |
| 4,930,606 | A | * | 6/1990 | Sporzynski et al. ... | 188/218 XL |
| 5,826,685 | A | * | 10/1998 | Engle ................... | 188/264 A |
| 6,454,201 | B1 | * | 9/2002 | Strobel et al. ......... | 242/379.1 |
| 6,457,567 | B1 | * | 10/2002 | Bunker ................. | 188/18 A |
| 2003/0006108 | A1 | * | 1/2003 | Larkin et al. ......... | 188/218 XL |
| 2004/0178030 | A1 | * | 9/2004 | Pacchiana et al. .... | 188/218 XL |

FOREIGN PATENT DOCUMENTS

| | | | |
|---|---|---|---|
| DE | 3311293 | * | 10/1984 |
| GB | 2307960 | * | 6/1997 |
| JP | 64-87931 | * | 4/1989 |
| WO | WO02/101259 | * | 12/2002 |

* cited by examiner

*Primary Examiner*—Bradley T King
(74) *Attorney, Agent, or Firm*—Ostrolenk Faber LLP

(57) ABSTRACT

An assembly comprised of a brake disk with a hub. Webs which are adjacent to one another in the circumferential direction extend between and are anchored to the brake disk and are attached to the hub. At least two of the webs which are adjacent to one another in the circumferential direction are formed together in one piece, either from a bent section joining the webs or because adjacent segments having respective adjacent webs are attached. The webs absorb stresses between the brake disk and the hub.

23 Claims, 5 Drawing Sheets

ASSEMBLY COMPRISED OF A BRAKE DISK WITH A HUB

FIELD OF THE INVENTION

The present invention relates to an assembly comprised of at least one brake disk with a hub comprised of webs which are adjacent to one another in the circumferential direction between the brake disk and the hub, wherein the webs which are anchored to the brake disk are attached to the hub.

BACKGROUND OF THE INVENTION

An assembly of this type is described in AT 265359. A brake disk having a cast friction body is connected by spokes to a hub made of steel. The hubs are individual iron profiles. In order to manufacture the assembly, the spokes are first embedded in a casting mold for the friction body and are cast in order then to be welded to the outer surface of the hub.

Such an assembly can be used for easily connecting brake disks and brake disk pots which are made of different materials to one another. One of the objectives in the manufacture of modern disk brakes for motor vehicles is rapid, simple and cost-effective mounting of such an assembly. Having a large number of individual spokes which have to be inserted into the casting mold and subsequently adjusted has a disadvantageous effect on the fabrication times and on the precision of the assembly.

Technical requirements for such an assembly are stringent. Different thermal expansion rates between the friction ring and the brake disk pot have to be compensated for without thermal stresses or deformations (known in the specific field as corrugations) of the brake disk occurring. Accordingly, the assembly must be elastic enough for expansions of the brake disk due to heating in both the radial and axial directions to be sufficiently compensated between the brake disk chamber and the brake disk.

SUMMARY OF THE INVENTION

The object of the invention is therefore to provide an assembly comprised of a brake disk and a hub which is easy and cost-effective to manufacture and which also fulfills the stringent requirements in terms of compensating for thermal expansion rates.

This object is achieved by the invention which concerns an assembly comprised of at least one brake disk with a hub. Webs which are adjacent to one another in the circumferential direction extend between and are anchored to the brake disk and the hub. At least two of the webs which are adjacent to one another in the circumferential direction are formed together in one piece, either from a bent section joining them or because adjacent segments having respective adjacent webs are attached. The webs absorb stresses between the brake disk and the hub.

The term hub is to be understood as referring to all hub-like mechanical connecting elements which connect to a wheel or to a plurality of wheels of a vehicle and which are also suitable for transmitting braking torques to the wheel or wheels in the circumferential direction. The classic example of such a hub is a brake disk chamber which is connected to the wheel body by bolts.

At least two of the webs of the assembly which are directly adjacent to one another, or preferably all of the webs or spokes of the assembly, are bent together to form one piece from a bent profile to form a ring in the shape of a star. Alternatively, individual segments made of bent profile are either attached to one another in the circumferential direction of the hub to form a ring which is formed in the shape of a star, or alternatively the segments are inserted individually into the brake disk or between the brake disks and are then connected to the hub.

The profile may have any desired cross sections, for example that of a square which is rectangular or quadratic in section, or cross sections of round profiles. The cross sections have identical or alternatively changing geometric dimensions along the profile.

The profile, which is preferably a round steel with a diameter in the cross section of 5-10 mm, is bent. The profile which is in one part and thus has all the limbs is connected to the bending ends which are brought together. The tips of the prongs of the ring which point radially outward are rounded, for example, by bending radii of the wire. It is also conceivable to use a ring which is bent in a meandering shape and has radially outwardly pointing clips.

The individual segments are bent into their defined, clip-shaped form, as an alternative to a ring made of a profile. The radially outwardly pointing ends of the limbs are either flattened in the region of the limbs which is anchored to or in the brake disk, or are alternatively upset in the shape of nail heads or optionally also bent over in tangential directions.

The prongs of the star-shaped profile or the outwardly projecting free ends of the limbs are preferably connected to the cast material of the brake disk by casting. It is conceivable here for the surface of the region which is surrounded by casting to be provided with a separating agent before the casting is carried out around it. Such webs which are embedded in the brake disk are not rigidly connected to the brake disk but rather can move separately, in particular radially, in the brake disk of the cast material within a small degree of play by virtue of the separating layer. Thermal expansions of the brake disk are thus compensated by means of relative movements of the brake disk with respect to the webs.

The profile is preferably rigidly connected to the material of the brake disk since elastic compensation of the thermal expansion of the brake disk is accomplished by the regions of the webs which extend radially in the direction of the hub and which in doing so, project into the annular gap between the hub and brake disk.

The limbs or the segments are either arranged along the circumference of the hub to have the same pitch as one another or are optionally adjacent to one another along the circumference with different intervals.

The hub which is preferably embodied as a brake disk chamber has attachment holes around the central hole in the centrally perforated base of the chamber. In order to attach the brake disk chamber to the vehicle, in each case one screw or clamping bolt or other attachment or bolt engages axially through each of these attachment holes. The brake disk chambers generally have three, four or five of these attachment holes. The attachment holes are spaced apart from one another at the same radial distance from the axis of rotation of the hub and generally with uniform pitch, that is with the same distance measured in radians along the circumference. One embodiment of the invention provides for the number of webs of the assembly to be at least precisely as large as the number of the attachment holes in the flange of the hub on which the assembly is formed. This also provides for the number of webs to be an integral multiple of the number of attachment holes.

A further embodiment of the invention provides in each case for two of the webs in the circumferential direction of the hub with a section of the profile of the webs to be connected to one another. From this arrangement, the webs are generally formed in one piece with the section. The section bears radially against the outside of the hub and is connected thereto the hub, as are also the webs.

It is conceivable that at least every pair, or every second pair, of two of the webs which are directly adjacent to one another is arranged along the circumference on each side of an imaginary axial plane which starts from the axis of rotation, being aligned longitudinally with the axis of rotation, and in which in each case the central axis—extending in the same direction as the axis of rotation—of one of the attachment holes lies. The axial plane forms an interface with the surface of the hub. Preferably at least every second section bears against the interface on the surface of the hub and is attached to this interface or at least along the circumference on each side of this interface of the hub, preferably by welded connections.

The previously described relationship between the axial and circumferential orientation of the attachment points of the webs on the hub to the attachment holes is important here in particular if the hub/brake disk system is to be adjusted in an optimum way so that the anticipated deformations of the brake disk are as small as possible. By means of the previously mentioned measures, the deformations and stresses in the system, which would otherwise have an unfavorable influence on one another can be selectively isolated from one another, or are partially or entirely prevented by means of these measures. Such deformations are produced, for example, by screwing of the hub into the attachment holes, by thermal stresses on the assembly and on the brake disk and also as a result of the application of brake torques to the system.

Pairings of different materials in the assembly are provided. The objective is that at least the materials of the brake disk and of the profile will have identical coefficients of thermal expansion. The materials of the brake disk are, for example, grey cast iron, ductile cast iron and ceramics.

The material of the profile/profiles is preferably a non-rusting steel. It is conceivable, for example, to use ferritic and at the same time rust-resistant steel. It is also possible to use any desired weldable types of steel. The webs or alternatively the entire assembly are coated on the surfaces either before they are attached to one another or afterward to provide protection against corrosion, for example. An alternative to attaching the profile by welding is riveting, for example.

The brake disks are provided on the axially lateral friction faces with axial depressions which preferably extend radially over a specific width of a few millimeters and of an axial depth into the brake disk and which are directly axially adjacent to the region at which the limbs are anchored to the brake disk. As a result, deformations such as axial corrugations on the brake disk due to different thermal expansion rates of the materials which are anchored to one another are avoided.

The assembly is generally more elastic at the profile in the radial annular gap between the brake disk and the hub than the comparatively rigid structures of the hub and of the brake disk. Such an assembly makes it possible to prevent deformations on the brake disk such as "corrugations" and to compensate for thermal expansion of the brake disk in the radial and axial directions. In the radial gap, the profile is therefore at least radially elastic enough to compensate such deformations in an elastically flexible fashion, and rigid enough in the tangential or circumferential direction of the hub to transmit the braking torques via the assembly virtually without deformations.

The assembly is easy and cost-effective to manufacture. The elasticity of the webs in the annular gap can be adjusted easily and virtually to any desired extent by changing the geometry of the assembly.

Other features and advantages of the present invention will become apparent from the following description of the invention which refers to the accompanying drawings.

BRIEF DESCRIPTION OF THE DRAWINGS

The invention will be explained in more detail below with reference to exemplary embodiments. In the drawings.

DETAILED DESCRIPTION OF PREFERRED EMBODIMENTS

Figure 1:
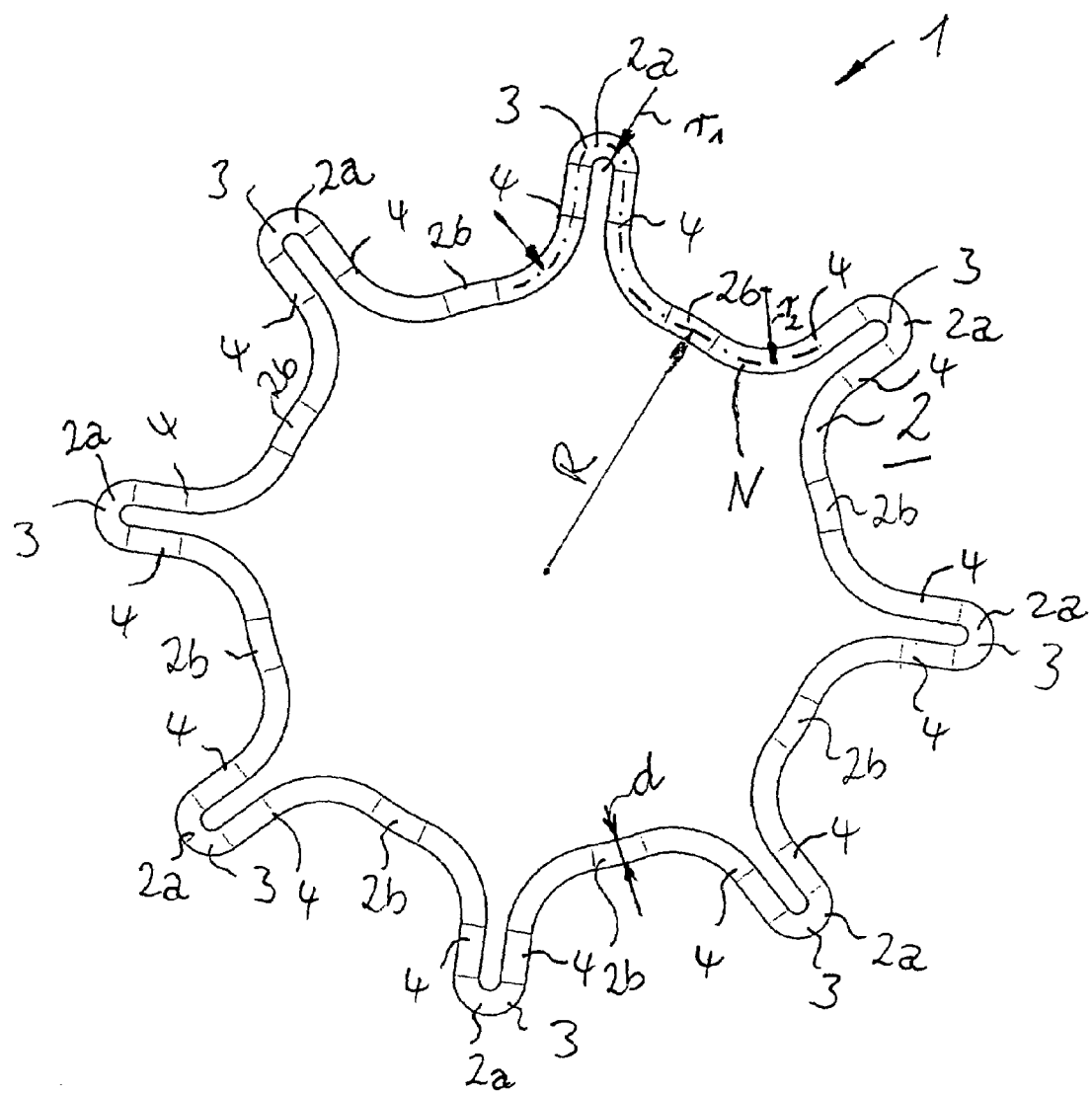
FIG. 1 shows an exemplary embodiment of a wire ring for the assembly according to the invention.

A connector element 1 shown in FIG. 1 is a continuous, generally ring shape 2 made of wire, and the ring is formed in the shape of a star. The ring 2 has a profile with a round cross section and is star shaped to define prong-like pins 3 which are directed radially outward. Each of the pins 3 is formed by two webs 4 of the ring which are directly adjacent to one another. The webs 4 merge into one another in the circumferential direction regions between the pins of the sections 2a and 2b of the ring.

The shape of each section 2a is predefined by the bending radius r1 of the neutral bending line N. The sections 2b are firstly described by the radius R1 with respect to the bending line N. The radius $R_1$ is the internal radius of the ring 2. The radius $R_1$ corresponds to the external radius of the seat of the ring 2 on a hub 5 according to FIG. 2 which is formed as a brake disk chamber, plus half the diameter d of the wire. Further along section 2b in both circumferential directions, it is curved radially outward and is described by the radii r2. At the radii r2 sections 2b merge with the webs 4, and the two webs 4 of each of the pins 3 merge with one another through one of sections 2a to form a U-shaped section.

Figure 2:
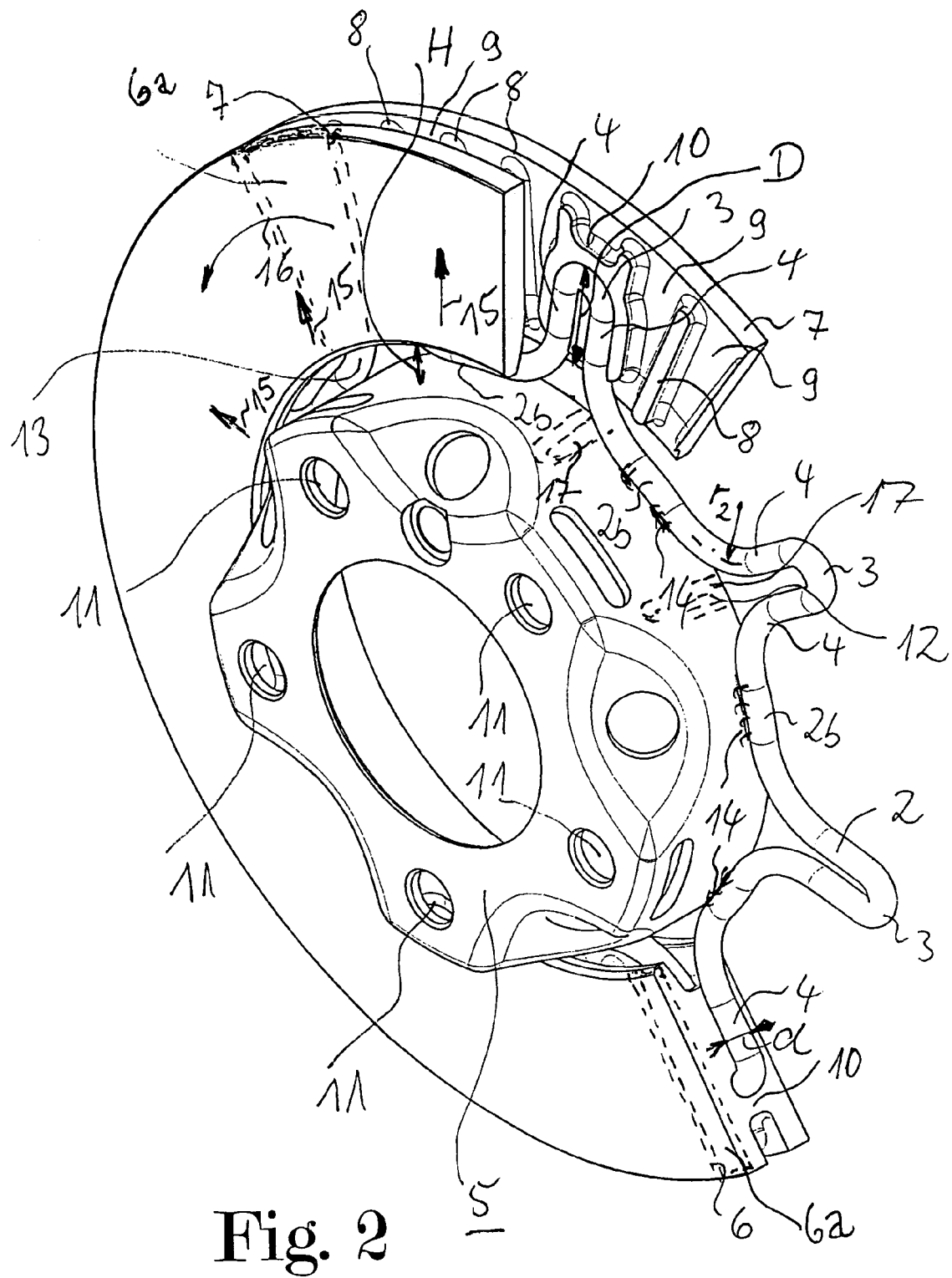
FIG. 2 shows an overall view of a unit comprised of a brake disk and brake disk pot which are connected to one another by means of an exemplary embodiment of the assembly according to the invention, shown in a partially sectional view.

FIG. 2 shows the connection of a brake disk 6 to the hub 5 by the ring 2. The brake disk 6 is formed from two disk sections 7 which lie axially opposite one another. The disk sections 7 are connected to one another by means of radially aligned longitudinally extending ribs 8. Venting slits 9 are formed between the longitudinal ribs 8.

Anchoring elements 10 are formed on the brake disk 6 between its disk sections 7. The number of anchoring means 10 and their pitch spacing along the circumference with respect to one another corresponds to the number of pins 3 and to their pitch spacing in the circumferential direction.

The hub 5 is formed as a brake disk chamber and has attachment holes 7 for attaching the assembly comprised of the brake disk 6, ring 2 and hub 5 to the wheel. The ring 2 is seated on a circular-cylindrical section 12 of the hub 5. The brake disk 6 is concentric with respect to the hub 5 and at the same time is arranged spaced apart from the hub 5 by a radial annular gap 13.

The profile of the ring 2 first extends with the sections 2b in the radial and annular gap 13 between the brake disk 6 and the hub 5. At the same time, the ring on the sections 2b is connected to the hub 5 by means of welds 14. Further along, the profile overcomes, by means of the radially outwardly curved ends of the sections 2b, the annular gap 13 in the direction of the brake disk 6 and finally passes between the disk sections 7 at the webs 4. Anchoring elements 10 on at least one disk section engage around each of the webs 4.

The embodiments of the invention provide a positively locking connection or alternatively a rigid connection between the ring 2 and the anchoring elements 10. For a positively locking connection, at least the pins 3 are provided in the respective anchoring elements 10 with sliding layers/separating layers which permit relative movement (as a result of thermal expansion) of the brake disk 6 with respect to the pins 3 in the radial direction, which is indicated by the arrow 15, after the material of the brake disk 6 has been cast around the ring 2.

A positively locking engagement between the brake disk 6 and the ring 2 which is attached to the hub 5 is brought about in the circumferential direction indicated by the arrow 16 so that a braking torque can be transmitted to the hub 5 by the brake disk 6.

However, one preferred embodiment of the invention provides for the pins 3 to be rigidly connected to the brake disk 6 by the anchoring elements 10. In this case, the webs 4 are firmly embedded in the anchoring elements 10. Thermal expansion at the brake disk 6 is compensated for in this case into the free space of the annular gap 13 by elastic deformations of the webs 4, in particular at the sections 2b and at the same time in turn in particular in the region of the radii $r_2$. At the webs 4, the ring 2 has a behavior which is comparatively elastic with respect to the rigid construction of the hub 5 and brake disk 6.

Elastic compensation of thermal expansion and other deformations at the brake disk 6 in the annular gap 13 is generally provided both in the case of positive locking and also in the case of rigid anchoring of the ring 2 to the anchoring elements 10. Alternatively, the hub 5 is also made elastically flexible in the radial direction if the hub 5 is provided, for example, with the slits 17 which are aligned axially (as indicated on the illustration).

The brake disk 6 is alternatively provided in the region of the anchoring elements 10 with the axial depressions 6a which are illustrated by dashed lines. Axial thermal expansion of the brake disk in the region of the anchoring element 10 is compensated for by the depressions 6a.

The ratio of the radial immersion depth D of the pins 3 into the brake disk 6 with respect to the height H of the annular gap is in this case approximately 2:1. The elasticity of the connection between the brake disk 6 and the hub 5 is determined by this ratio, by the radial height H of the annular gap and thus by the lever ratios prevailing at the webs 4, as a function of the diameter d of the profile on the ring. The radial height H of the annular gap 13 with constant diameter d of the wire is directly proportional to the elasticity of the connection. By changing the height H and the diameter d and by means of different radii $r_1$, $r_2$, R it is possible to set the elasticity of the connection in an application-related fashion.

Figure 5:
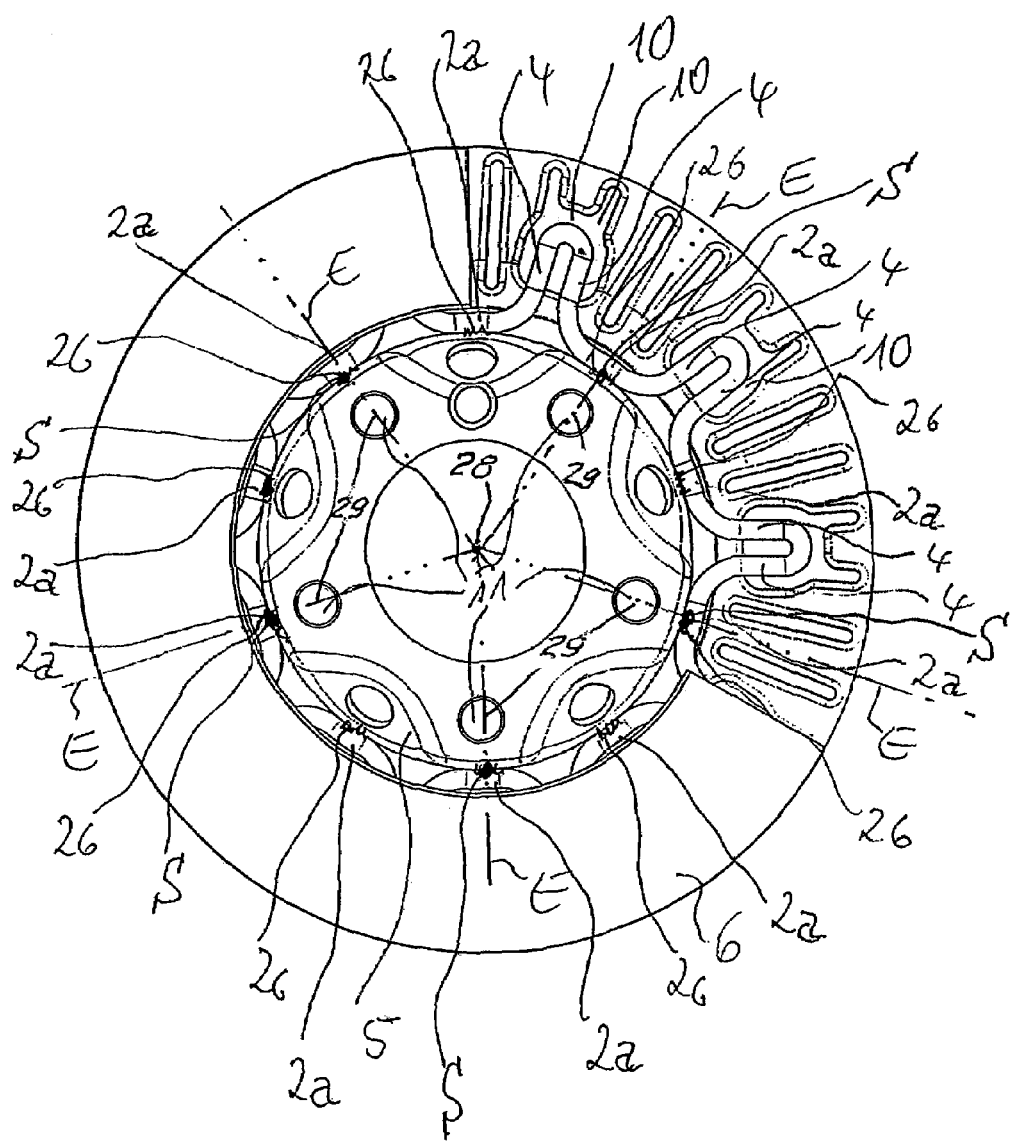
FIG. 5 shows a front view of the unit comprised of the brake disk and brake disk pot showing an example of the circumferential orientation of the webs with respect to the attachment holes.

FIG. 5 shows, for example, that the assembly with 20 webs 4 has four times as many of the webs 4 as the quantity of attachment holes 11, namely 5 holes 11, which are formed in the flange 27. In each case two adjacent webs 4 are formed in one piece by a section 2a and are connected to one another by the section 2a which this time is at the circumference of the hub. In FIG. 5, every second section of the sections 2a is located at least at a point of intersection S of the external contour of the hub 5 with one of the planes E and is attached to the hub at least there by means of the welds 26. The plane E extends axially with the axis 28 of rotation into the plane of the illustration of FIG. 5 and extends outward in the radial direction. The central axis 29 of each of the attachment holes 11 extends in the same direction as the axis 28 of rotation and lies in each case in one of the planes E.

Figure 3:
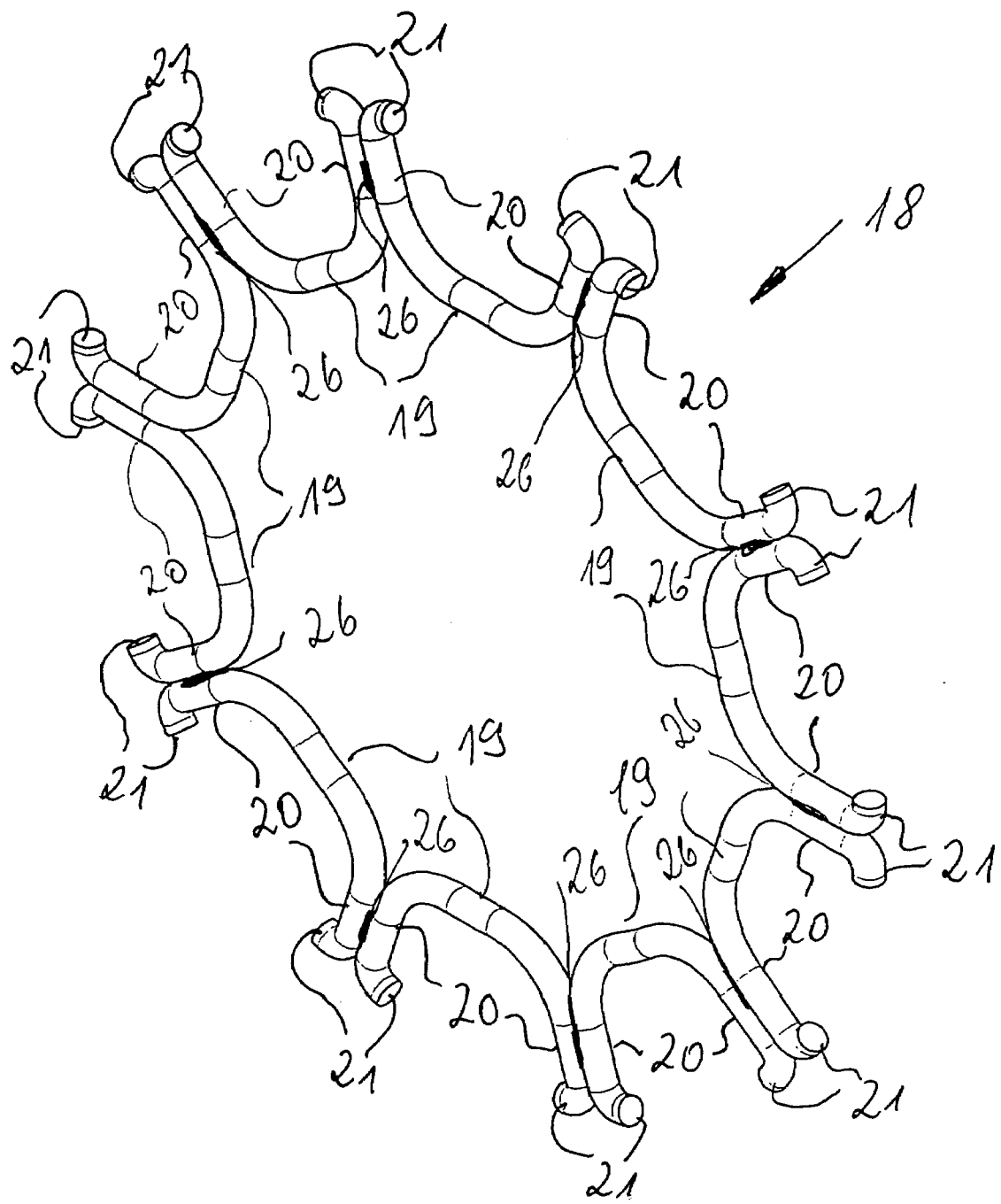
FIGS. 3 and 4 show further exemplary embodiments of a wire ring for the assembly according to the invention, the wire ring being comprised of individual segments each having two limbs.

FIG. 3 shows a further exemplary embodiment of a wire ring 18. It is formed from individual wire segments 19 which are combined on the circumferential side of the hub 5. Each individual segment of the segments 19 is of mostly arcuate shape and initially points radially outward with the free ends 21 of the webs 20. However, the end sections of the free ends 21 of each segment 19 are bent to point to one another. At least the free ends 21 of the webs 20 are in the region of the ring 18 of the type anchored to the brake disk which is illustrated in FIGS. 2 and 5.

Figure 4:
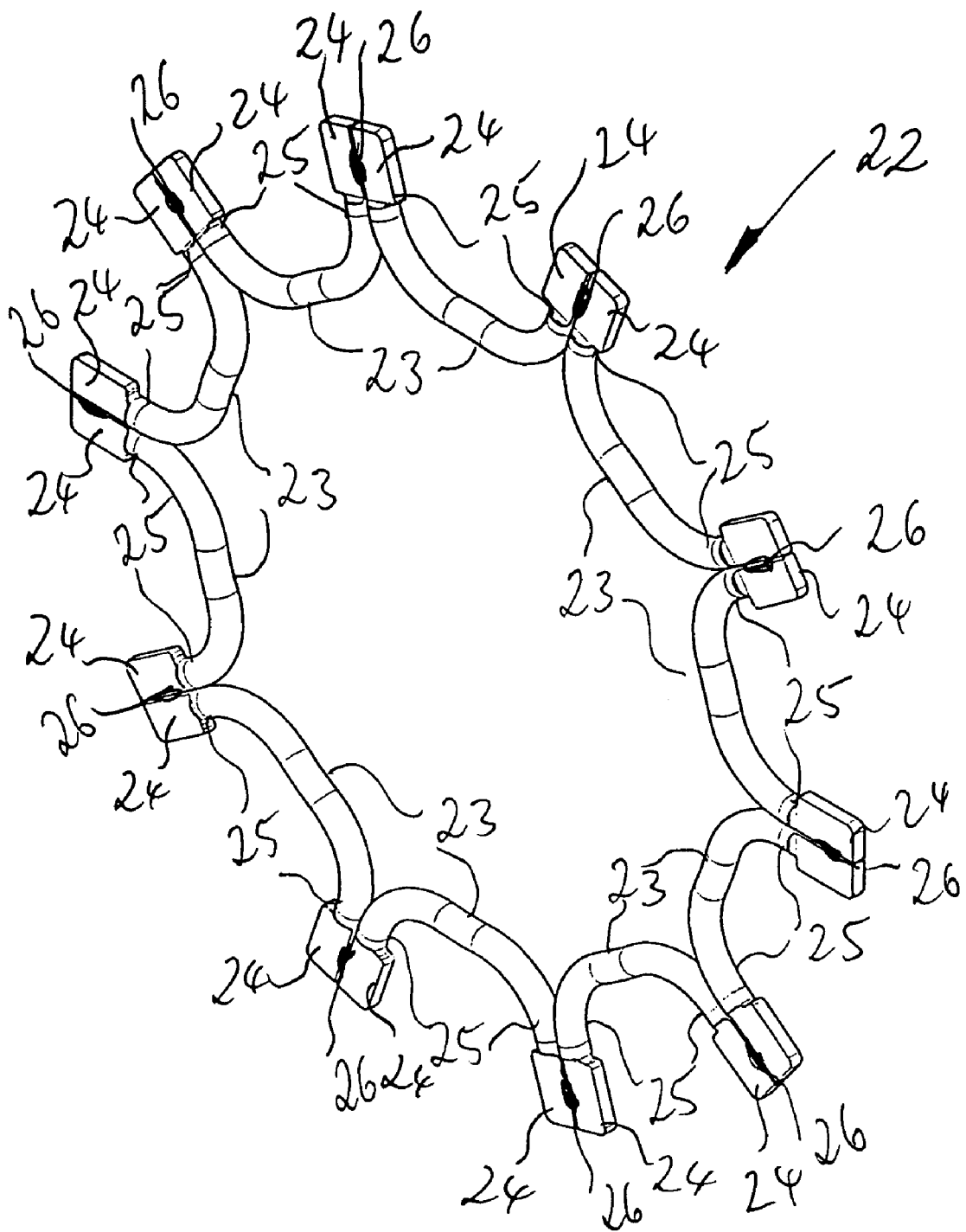

FIG. 4 shows a further embodiment of the invention in the form of a ring 22 comprised of segments 23 which are connected to one another at the circumference and at which segments have free ends 24 which are flattened in the region where webs 25 are anchored to the brake disk. In this arrangement, the limbs 25 are flattened out in the axial directions in comparison with the remaining round profile of the segments 23. In each of FIGS. 3 and 4, the webs 20 and 25 which are directly adjacent to one another of two segments 19 and 23 which are adjacent to one another in the circumferential direction are attached to one another by means of welds 26.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An assembly comprising
   a brake disk and a hub; and
   a ring connector connecting the brake disk and the hub, the ring connector including webs adjacent to one another around a circumference of the hub, the webs being disposed between the brake disk and the hub, the webs being anchored to the brake disk and being attached to the hub, such that the hub does not rotate relative to the webs; wherein
   at least two of the webs which are adjacent to one another in a circumferential direction are formed together in one piece
   wherein the brake disk includes a first disk member and a second disk member connected to each other with a space therebetween and the webs are anchored to the brake disk in the space between the first disk member and the second disk member, and
   wherein the ring connector includes a plurality of U-shaped first wire sections, each of the U-shaped first wire sections having a circular cross-section along at least a portion of the length of the U-shaped first wire section, and the ring connector further includes a plurality of second wire sections, each of the plurality of second wire sections being located between an adjacent pair of the U-shaped first wire sections, each of the plurality of second wire sections including a portion with a radius with respect to a center of the hub such that the portion is seated on the hub.

2. The assembly as claimed in claim 1, wherein the hub and the brake disk are so shaped and placed as to define a radial annular gap between the hub and the brake disk, and the webs are elastically flexible at least in the radial annular gap and are elastically more flexible than the hub and the brake disk which are both comparatively more rigid than the webs.

3. The assembly as claimed in claim 1, further comprising the hub having a radial flange with attachment holes therein arrayed around the flange; at least precisely the same number of the webs as the number of the attachment holes in the flange of the hub, the attachment holes being distributed around an axis of rotation of the hub with a uniform radial distance from the axis of rotation, and the holes passing axially through the flange.

4. The assembly as claimed in claim 3, wherein the assembly has four times as many of the webs as the number of the attachment holes formed in the flange.

5. The assembly as claimed in claim 3, wherein each two of the webs which are adjacent to one another in the circumferential direction of the hub are connected to one another by one of the plurality of second wire sections.

6. The assembly as claimed in claim 5, wherein at least every second one of the plurality of second wire sections wherein two of the webs are connected to each other around the hub bears at least against a point of intersection of the hub with an imaginary axial plane with at least one central axis, which extends in the same direction as the axis of rotation of one of the attachment holes, lying in an axial plane which starts from the axis of rotation.

7. The assembly as claimed in claim 1, wherein the webs are welded to the hub.

8. The assembly as claimed in claim 1, wherein the webs are formed together in a ring having a bent profile.

9. The assembly as claimed in claim 1, wherein each two of the webs which are adjacent to one another in the circumferential direction of the hub are formed together on a bent segment, and a plurality of the segments are arranged adjacent to one another in the circumferential direction of the hub, and a web of one of the segments is directly adjacent, in the circumferential direction of the hub, with a web of the adjacent segment which follows directly in the circumferential direction.

10. The assembly as claimed in claim 9, wherein the respective webs which are directly adjacent to one another are attached to one another by the two segments which are adjacent to one another in the circumferential direction.

11. The assembly as claimed in claim 1, wherein each of the webs is a wire made of steel.

12. The assembly as claimed in claim 1, wherein the brake disk and the webs are of materials such that at least the materials of the assembly have an identical co-efficient of thermal expansion between the brake disk and the webs.

13. The assembly as claimed in claim 1, wherein each of the webs is a wire which is round in cross section.

14. The assembly as claimed in claim 1, wherein the webs are connected to the brake disk in a positively locking fashion.

15. The assembly as claimed in claim 14, wherein the webs are anchored to the brake disk to be at least radially displaceable in relation to the brake disk.

16. The assembly as claimed in claim 1, wherein the brake disk is of cast material and wherein the webs are embedded in at least one of the cast materials of the brake disk.

17. The assembly as claimed in claim 16, wherein the cast material is a grey cast iron.

18. The assembly as claimed in claim 16, wherein the brake disk includes axial depressions therein, the axial depressions being joined on both sides of the disk, and to the ends of the brake disk, and in the axial direction to a region at which the webs are anchored in the brake disk.

19. The assembly as claimed in claim 16, wherein the webs are rigidly connected to the brake disk.

20. The assembly as claimed in claim 1, wherein the first disk member and the second disk member lie axially opposite one another.

21. The assembly as claimed in claim 20, further comprising ribs connecting the brake disk sections to one another.

22. The assembly as claimed in claim 1, wherein the hub has a radially outer face and the hub and the brake disk are separated by an annular gap; two of the webs which are adjacent to one another in the circumferential direction initially bear against the outer face of the hub and are in the radial and annular gap between the brake disk and the hub, and then further along, the webs overcome the annular gap in the direction of the brake disk and extend between the disk sections.

23. The assembly as claimed in claim 1, wherein the at least two of the webs which are adjacent to one another in a circumferential direction are formed together in one piece from a bent profile.

* * * * *